United States Patent
Jeng (10) Patent No.: US 12,331,849 B2
(45) Date of Patent: Jun. 17, 2025

(54) DIAPHRAGM VALVES

(71) Applicant: DAOZ International Holding Limited, Wan Chai (HK)

(72) Inventor: Sheng-Hun Jeng, HsinChu (TW)

(73) Assignee: DAOZ INTERNATIONAL HOLDING LIMITED, Wan Chai (HK)

( * ) Notice: Subject to any disclaimer, the term of this patent is extended or adjusted under 35 U.S.C. 154(b) by 0 days.

(21) Appl. No.: 18/514,205

(22) Filed: Nov. 20, 2023

(65) Prior Publication Data

US 2025/0164016 A1   May 22, 2025

(51) Int. Cl.
*F16K 7/16*   (2006.01)

(52) U.S. Cl.
CPC ..................... *F16K 7/16* (2013.01)

(58) Field of Classification Search
CPC ..... F16K 7/14; F16K 7/16; F16K 7/17; F16K 7/20; F16K 1/36; F16K 1/38; F16K 47/04
See application file for complete search history.

(56) References Cited

U.S. PATENT DOCUMENTS

| | | | |
|---|---|---|---|
| 6,254,057 B1* | 7/2001 | Pubben | F16K 7/17 137/625.25 |
| 8,235,352 B2* | 8/2012 | Irwin | F16K 31/402 251/30.01 |
| 2013/0119290 A1* | 5/2013 | Takeda | F16K 31/122 251/368 |
| 2013/0341551 A1* | 12/2013 | Beck | F16K 27/00 251/366 |

FOREIGN PATENT DOCUMENTS

| | | | | |
|---|---|---|---|---|
| CN | 101097000 A | * | 1/2008 | ............... F16K 1/38 |
| KR | 101023799 B1 | * | 3/2011 | |

OTHER PUBLICATIONS

Machine English translation of CN101097000 (Year: 2024).*
Machine English translation of KR101023799 (Year: 2024).*

* cited by examiner

*Primary Examiner* — Hailey K. Do
(74) *Attorney, Agent, or Firm* — MUNCY, GEISSLER, OLDS & LOWE, P.C.

(57) ABSTRACT

A valve comprises a chamber allowing a diaphragm moving along the chamber to block a channel. The channel comprises four sections. An end of a second section connects to an inlet of the chamber. A flow in the second section diverts to the chamber. An outlet of the chamber connects to an end of a third section. The flow in the third section returns from the chamber to an original direction. The end of the second section has a shape to be blocked by the diaphragm when the diaphragm is moved to contact the end of the second section, and the diaphragm has a conical protrusion to guide the flow in the chamber when the diaphragm is moved away from the end of the second section.

16 Claims, 10 Drawing Sheets

DIAPHRAGM VALVES

FIELD

The present application relates to valves, and more particularly to valves with diaphragms for controlling fluid such as chemical solution, water or the like.

BACKGROUND OF THE INVENTION

The controlled amounts of chemical solutions or water are required in many manufacturing processes, for example, when a pharmaceutical factory produces drugs, or when a semiconductor factory coats the surface of a wafer to form a film of uniform thickness. Therefore, a precise valve is required for many industries. However, a valve installed in a flow channel has an impact on the fluid for resulting in a loss of pressure. Meanwhile, the valve needs to be able to block the fluid smoothly and completely to achieve precise control. Therefore, a valve that can reduce the loss of pressure for the liquid flowing through the valve and block the fluid smoothly and completely is required to achieve the precise control.

SUMMARY OF THE INVENTION

The present disclosure reveals valves with optimization of flow streamline and the better blocking effect.

One aspect of the present disclosure provides a valve comprising a controller and a body. The controller comprises a knob and a diaphragm, which is connected to and driven by the knob. The body comprises an opening, a chamber, and a channel. The opening is covered by the controller. The chamber contains the diaphragm and allows the diaphragm moving along the central line of the chamber. The channel comprises a first section, a second section, a third section and a fourth section. An end of the second section connects to an inlet of the chamber. An outlet of the chamber connects to an end of the third section. A flow in the second section diverts to the chamber from a central line of the first section, and the flow in the third section returns from the chamber to a central line of the fourth section. An annular bulge protrudes from the inner wall of the end of the second section wherein the annular bulge has a shape to be blocked by the diaphragm when the diaphragm is moved to contact the end of the second section.

Another aspect of the present disclosure provides a valve comprising a controller and a body. The controller comprises a knob and a diaphragm, which is connected to and driven by the knob. The body comprises an opening, a chamber, and a channel. The opening is covered by the controller. The chamber contains the diaphragm and allows the diaphragm moving along the central line of the chamber. The channel comprises a first section, a second section, a third section and a fourth section. An end of the second section connects to an inlet of the chamber. An outlet of the chamber connects to an end of the third section. A flow in the second section diverts to the chamber from a central line of the first section, and the flow in the third section returns from the chamber to a central line of the fourth section. The diaphragm has a conical protrusion to guide the flow.

Another aspect of the present disclosure provides a valve comprising a controller and a body. The controller comprises a knob and a diaphragm, which is connected to and driven by the knob. The body comprises an opening, a chamber, and a channel. The opening is covered by the controller. The chamber contains the diaphragm and allows the diaphragm moving along the central line of the chamber. The channel comprises a first section, a second section, a third section and a fourth section. An end of the second section connects to an inlet of the chamber. An outlet of the chamber connects to an end of the third section. A flow in the second section diverts to the chamber from a central line of the first section, and the flow in the third section returns from the chamber to a central line of the fourth section. The end of the second section has a shape to be blocked by the diaphragm when the diaphragm is moved to contact the end of the second section. An angle between the central line of the chamber and a vertical line of the first section of the channel is in a range of 20 to 60 degrees.

The foregoing has outlined rather broadly the features and technical advantages of the present disclosure in order that the detailed description of the disclosure that follows may be better understood. Additional features and advantages of the disclosure will be described hereinafter, and form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF DRAWINGS

A more complete understanding of the present disclosure may be derived by referring to the detailed description and claims when considered in connection with the example embodiments shown in the drawings, in which:

DETAILED DESCRIPTION OF THE INVENTION

Embodiments, or examples, of the disclosure illustrated in the drawings are now described using specific language. It shall be understood that no limitation of the scope of the disclosure is hereby intended. Any alteration or modification of the described embodiments, and any further applications of principles described in this document, are to be considered as normally occurring to one of ordinary skill in the art to which the disclosure relates. Reference numerals may be repeated throughout the embodiments, but this does not necessarily mean that feature(s) of one embodiment apply to another embodiment, even if they share the same reference numeral. It shall be understood that, although the terms first, second, third, etc. may be used herein to describe various elements, components, regions, layers or sections, these elements, components, regions, layers or sections are not limited by these terms. Rather, these terms are merely used to distinguish one element, component, region, layer or section from another region, layer or section. Thus, a first element, component, region, layer or section discussed below could be termed a second element, component, region, layer or section without departing from the teachings of the present inventive concept. The terminology used herein is for the purpose of describing particular example embodiments only and is not intended to be limited to the present inventive concept. As used herein, the singular forms "a," "an" and "the" are intended to include the plural forms as well, unless the context clearly indicates otherwise. It shall be further understood that the terms "comprises" and "comprising," when used in this specification, point out the presence of stated features, integers, steps, operations, elements, or components, but do not preclude the presence or addition of one or more other features, integers, steps, operations, elements, components, or groups thereof.

Valves according to embodiments of the present disclosure will be described with reference to the drawings. The present invention will be described in detail below with reference to the accompanying drawings.

Figure 1:
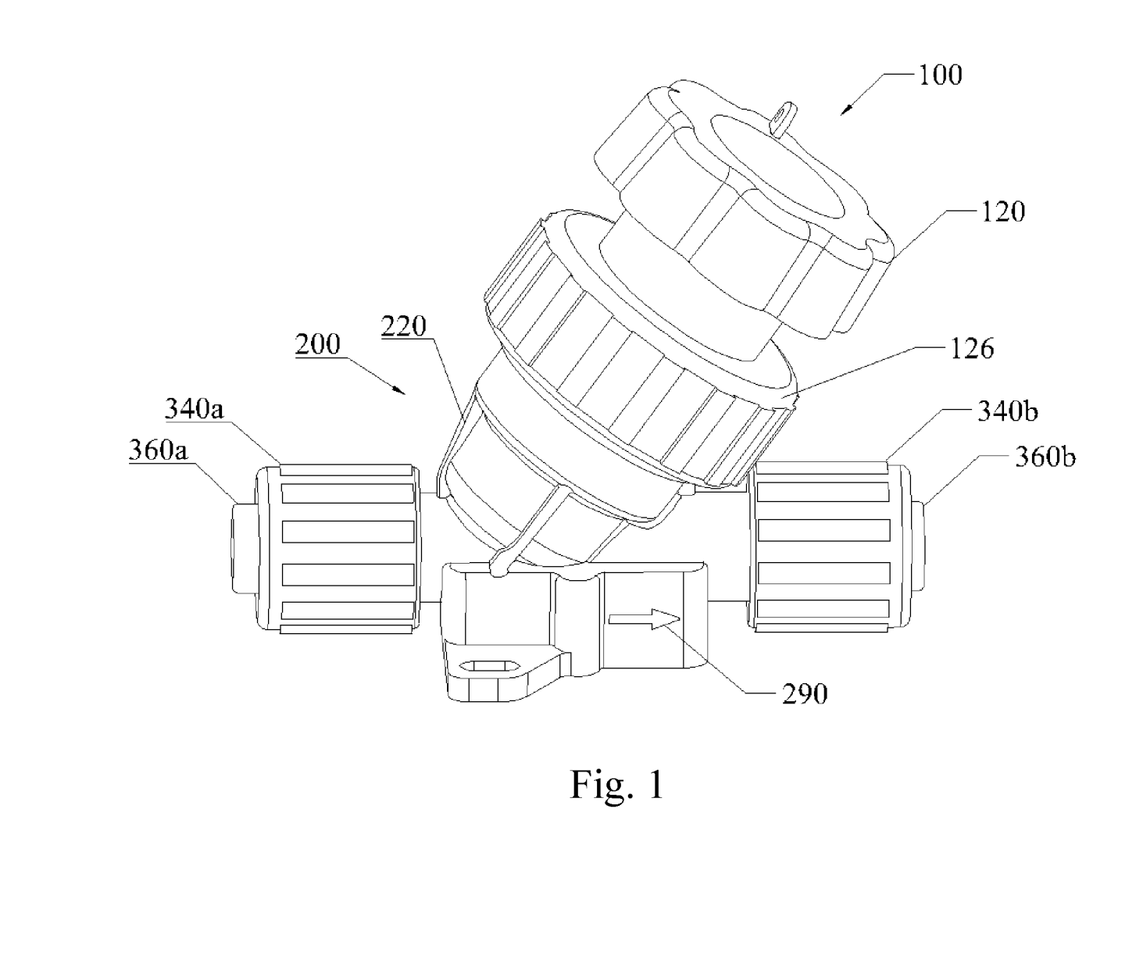
FIG. 1 is a perspective view of a diaphragm valve according to an embodiment of the present disclosure.
Figure 2:
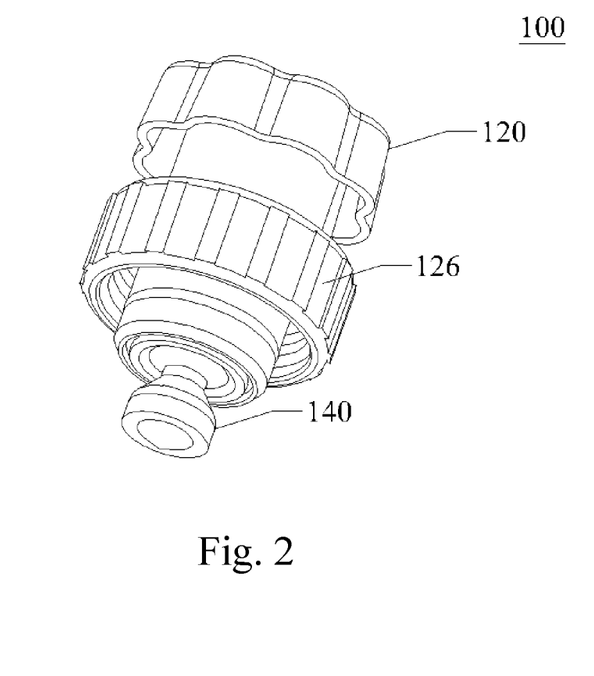
FIG. 2 is a perspective view of a controller of the diaphragm valve in FIG. 1.
Figure 3:
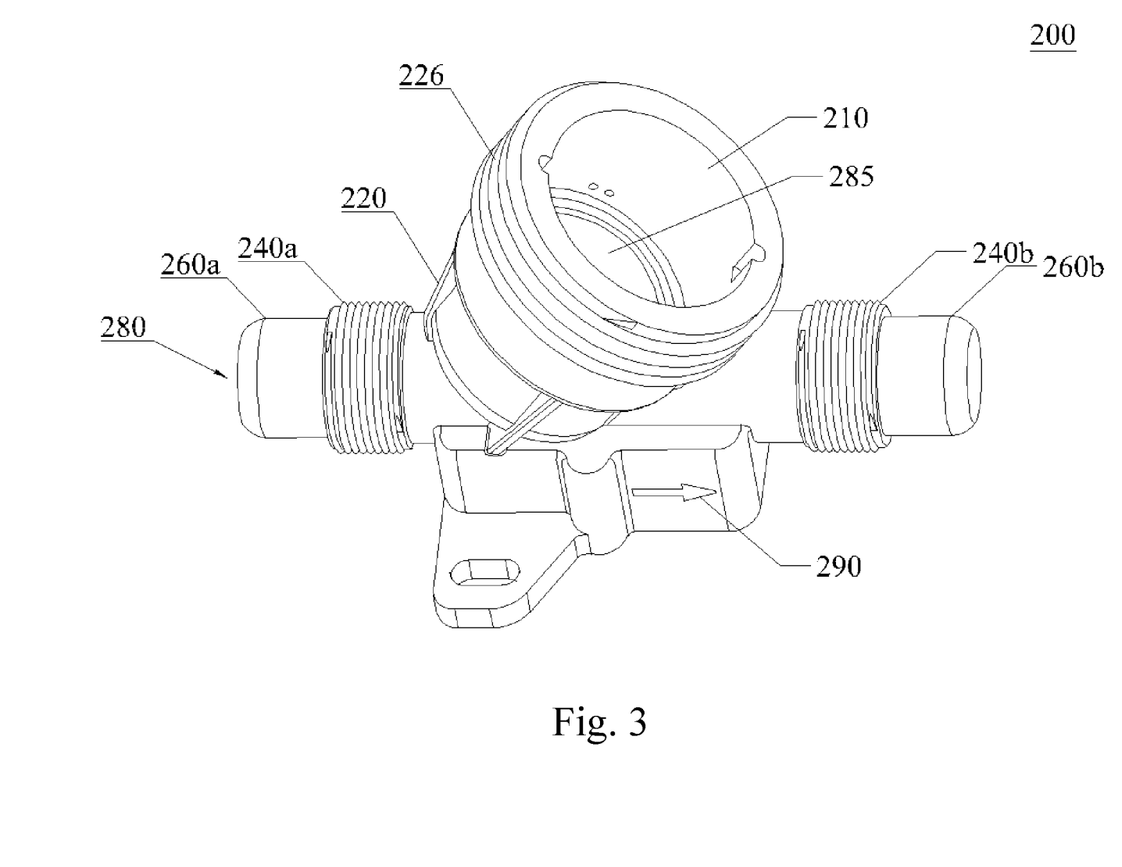
FIG. 3 is a perspective view of a body of a diaphragm valve in FIG. 1.

FIG. 1 is a perspective view of a diaphragm valve 10 according to an embodiment of the present disclosure. FIG. 2 is a perspective view of a controller 100 of the diaphragm valve 10 in FIG. 1. And, FIG. 3 is a perspective view of a body 200 of a diaphragm valve 10 in FIG. 1. As shown in FIG. 1, the diaphragm valve 10 of the present invention comprises a controller 100 and a body 200. As shown in FIG. 2, the controller 100 comprises a knob 120 and a diaphragm 140. The diaphragm 140 is connected to and driven by the knob 120. As shown in FIG. 3, the body 200 comprises an opening 210, a chamber 285, and a channel 280. The opening 210 is covered and sealed by the controller 100 as shown in FIG. 1, and a threaded sleeve 126 of the controller 100 is threaded into a threaded tube 226 of the opening 210.

As shown in FIGS. 1 and 3, the diaphragm valve 10 is installed between pipes 360a, 360b. The pipes 360a, 360b are connected respectively to an inlet 260a and an outlet 260b of the diaphragm valve 10 while the tube connectors 340a, 340b are set in 240a, 240b respectively. Moreover, the reinforce ribs 220 strengthen the structure of the chamber 285, and the arrow 290 shown in a side notes the direction of the flow. As used herein, the element "pipe" is intended to include "tubing" as well.

Figure 4:
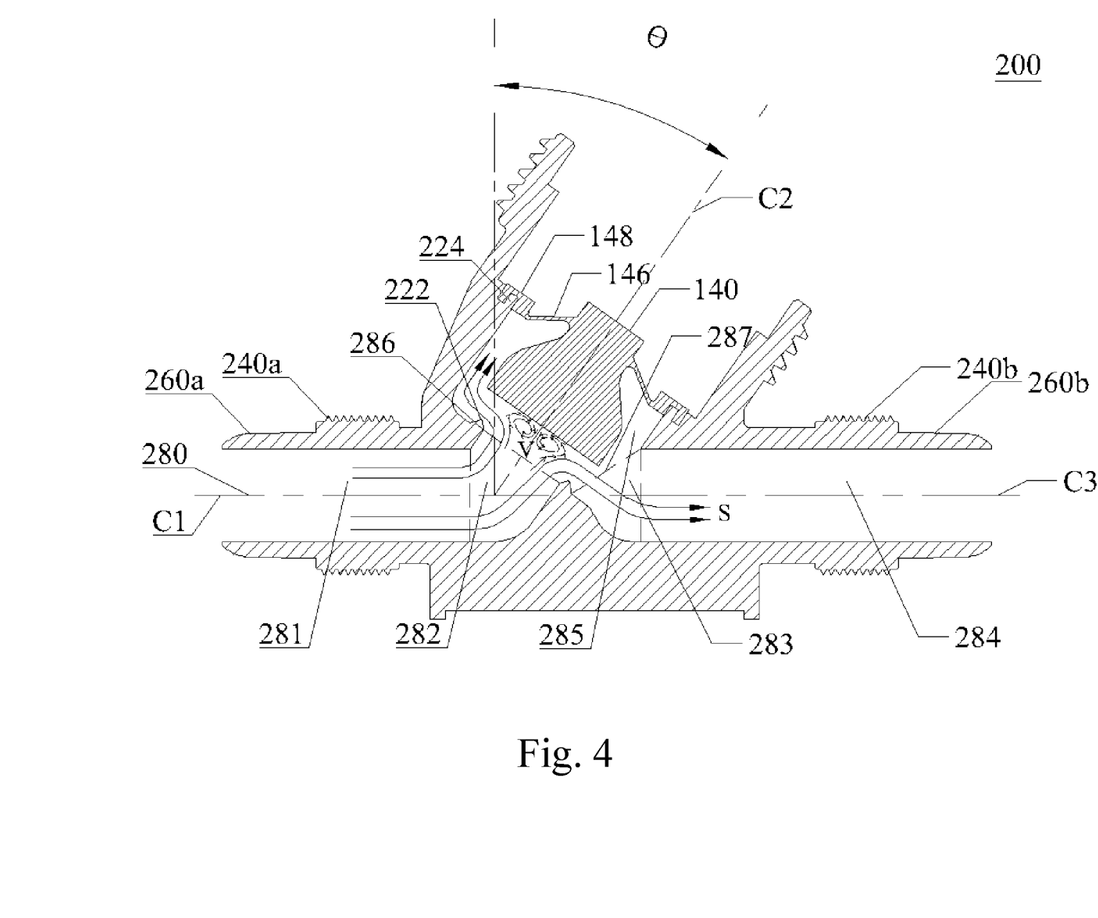
FIG. 4 is a cross-sectional view of a body with a diaphragm according to an embodiment of the present disclosure.
Figure 5:
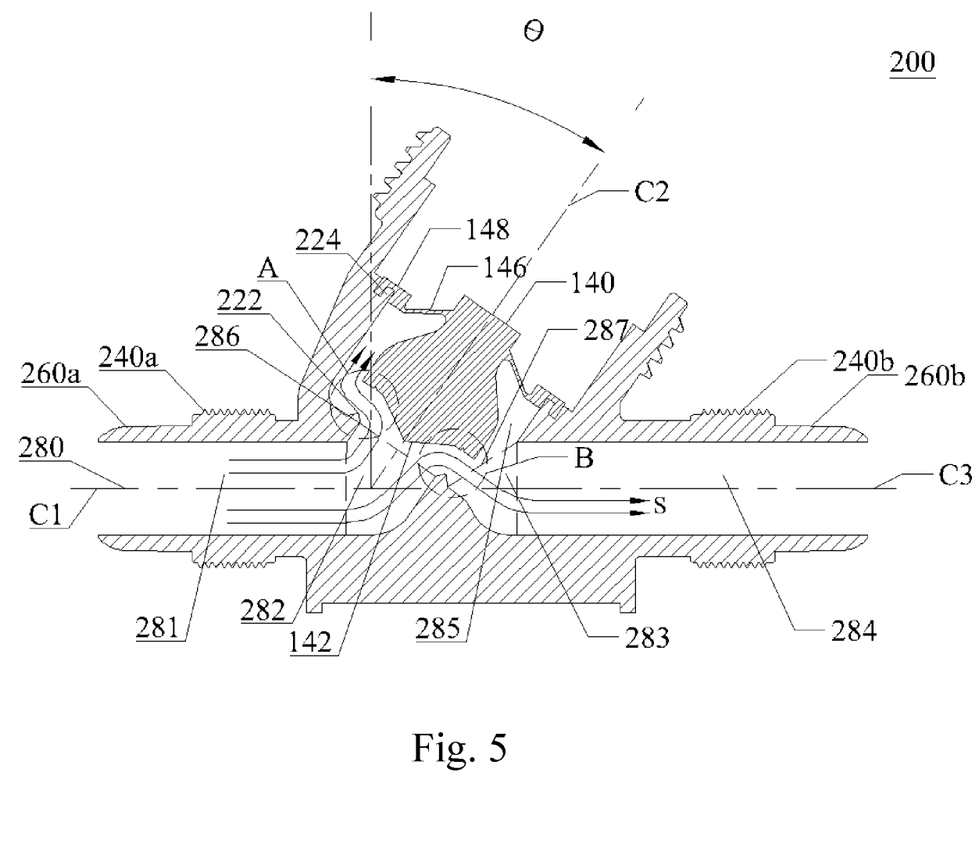
FIG. 5 is a cross-sectional view of a body with a diaphragm according to another embodiment of the present disclosure.

FIGS. 4 and 5 are cross-sectional views of a body with a diaphragm according to embodiments of the present disclosure. The chamber 285 contains the diaphragm 140 and allows the diaphragm 140 moving along the central line C2 of the chamber 285. The channel 280 comprises a first section 281, a second section 282, a third section 283 and a fourth section 284. An end 286 of the second section 284 connects to an inlet of the chamber 285, and the end 286 of the second section 282 is in a plane vertical to the central line C2 of the chamber 285. An outlet of the chamber 285 connects to an end 287 of the third section 283. A flow S in the second section 281 diverts to the central line C2 of the chamber 285 from a central line C1 of the first section 281. Further, the flow S in the third section returns from the chamber 285 to a central line C3 of the fourth section 284.

As shown in FIGS. 4 and 5, an angle θ between the central line C2 of the chamber 285 and a vertical line of the first section 281 of the channel 280 is in a range of 20 to 60 degrees. In a preferred embodiment of the present disclosure, the loss of the pressure is minimum for the liquid flowing through the diaphragm valve 10 while the angle θ between the central line C2 of the chamber 285 and a vertical line of the first section 281 of the channel 280 is around 35 degrees. Moreover, the diaphragm 140 has a flexible ring 146 and a grooved ring 148. The flexible ring 146 is used to adaptively separate the fluid in the chamber 285 from the air, and the grooved ring 148 is used to engage the diaphragm mount 224.

The embodiment shown in FIG. 4 has a flat surface in the bottom of the diaphragm 140, and the space between the diaphragm 140 and the flow path allows vortexes V to be generated. However, the vortexes V affect the flow. Thus, another embodiment sown in FIG. 5 has a conical protrusion 142 in the bottom of the diaphragm 140, and there is no space allowing vortexes V to be generated. Namely, the diaphragm 140 has the conical protrusion 142 to guide the flow to eliminate the vortexes V.

Figure 6:
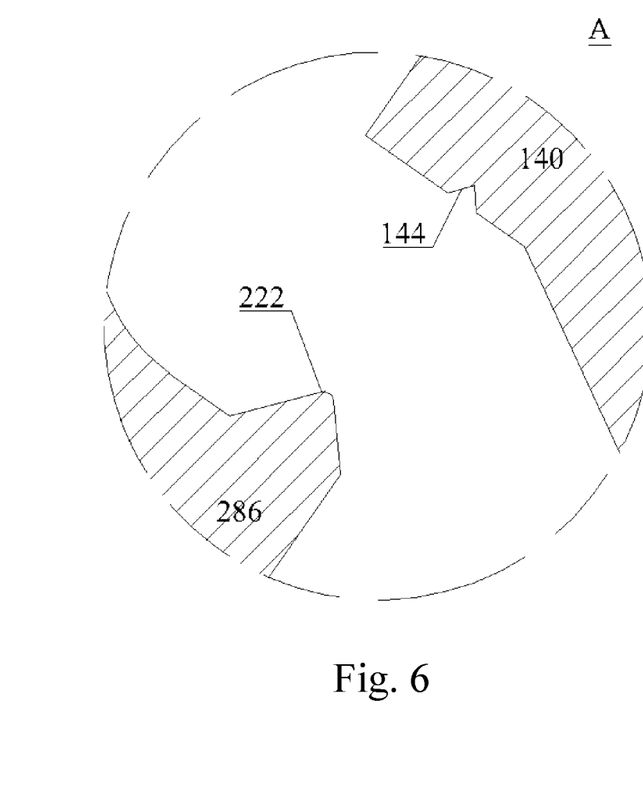
FIG. 6 is an enlarged view showing a detail structure in Area A of a cross-sectional view of a body of FIG. 5.
Figure 7:
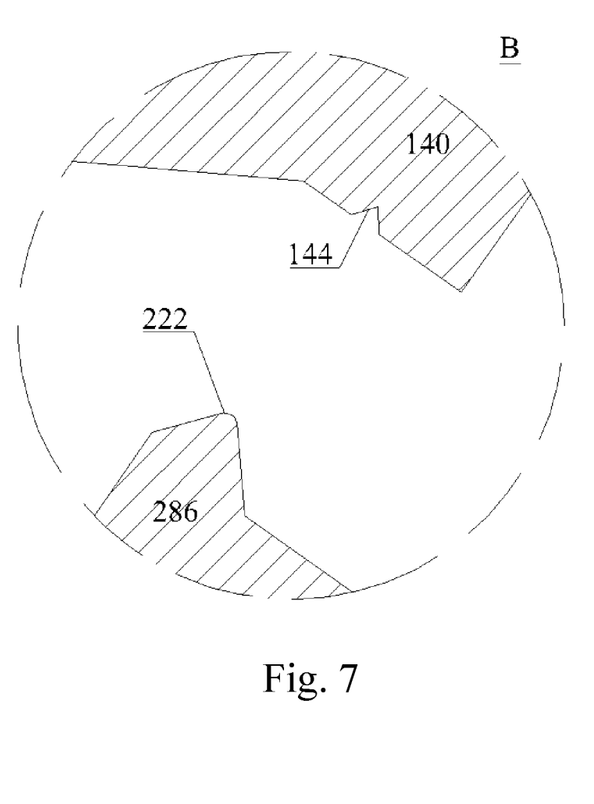
FIG. 7 is an enlarged view showing a detail structure in Area B of a cross-sectional view of a body of FIG. 5.

FIG. 6 is an enlarged view showing a detail structure in Area A of a cross-sectional view of a body of FIG. 5, and FIG. 7 is an enlarged view showing a detail structure in Area B of a cross-sectional view of a body of FIG. 5. As shown in FIGS. 6 and 7, an annular bulge 222 protrudes from the inner wall of the end of the second section 282 wherein the annular bulge 222 has a shape to be blocked by the diaphragm 140 when the diaphragm 140 is moved to contact the end 286 of the second section 282. In a preferred embodiment of the present disclosure, an annular groove 144 on the diaphragm 140 engages the annular bulge 222 when the diaphragm 140 is moved to contact the end 286 of the second section 282.

Figure 8:
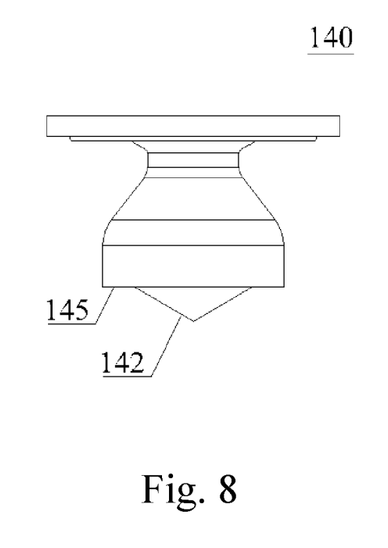
FIG. 8 is a side view showing a diaphragm according to the embodiment of FIG. 5.
Figure 9:
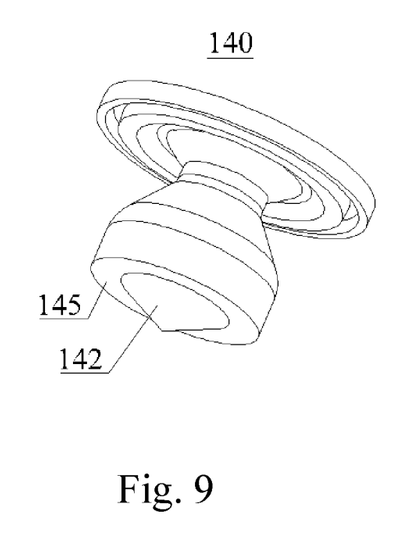
FIG. 9 is a perspective view showing a diaphragm according to the embodiment of FIG. 5.
Figure 10:
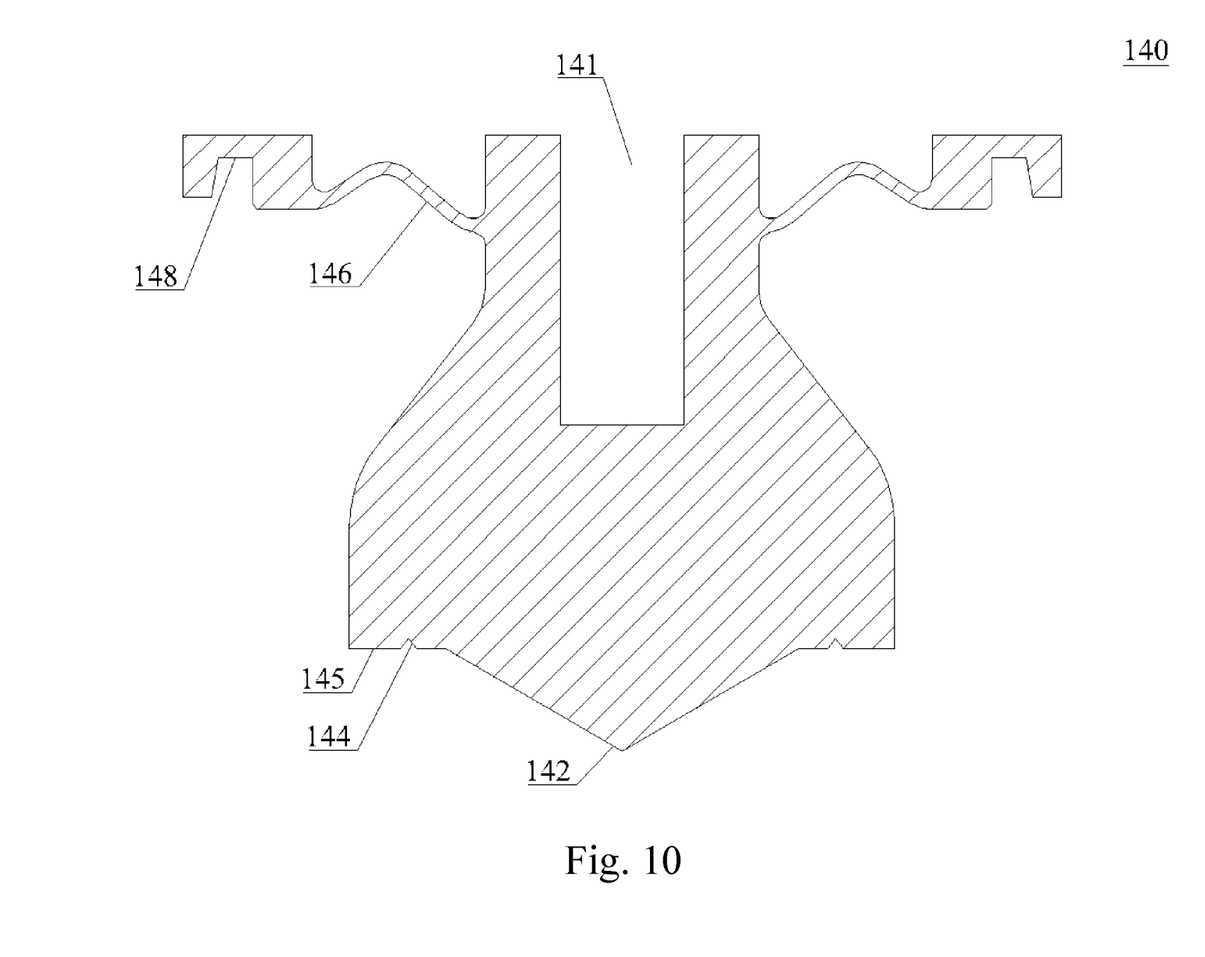
FIG. 10 is a cross-sectional view of a diaphragm according to the embodiment of FIGS. 8 and 9.

FIG. 8 is a side view showing a diaphragm 140 according to the embodiment of FIG. 5, and FIG. 9 is a perspective view showing a diaphragm 140 according to the embodiment of FIG. 5. FIG. 10 is a cross-sectional view of a diaphragm 140 according to the embodiment of FIGS. 8 and 9. In preferred embodiments of FIGS. 8-10, a flat area 145 is around the protrusion 142. In a preferred embodiment of FIG. 10, an annular groove 144 is on the flat area 145 wherein the annular groove 144 fits the annular bulge 222. Further, the diaphragm 140 has a notch 141 to contain devices that connect to the knob 120 as shown in FIG. 2.

Figure 11:
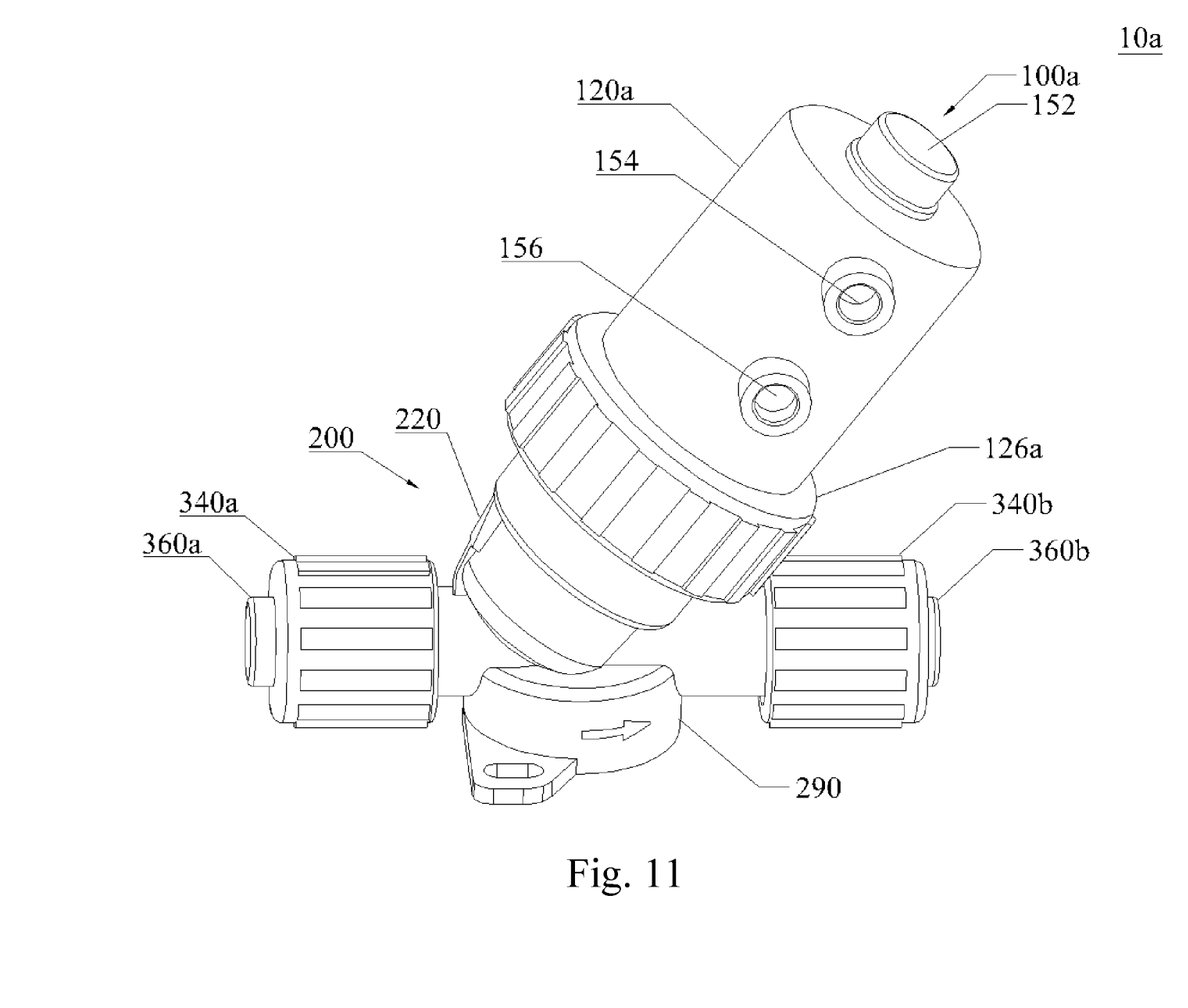
FIG. 11 is a perspective view of a diaphragm valve according to another embodiment of the present disclosure.
Figure 12:
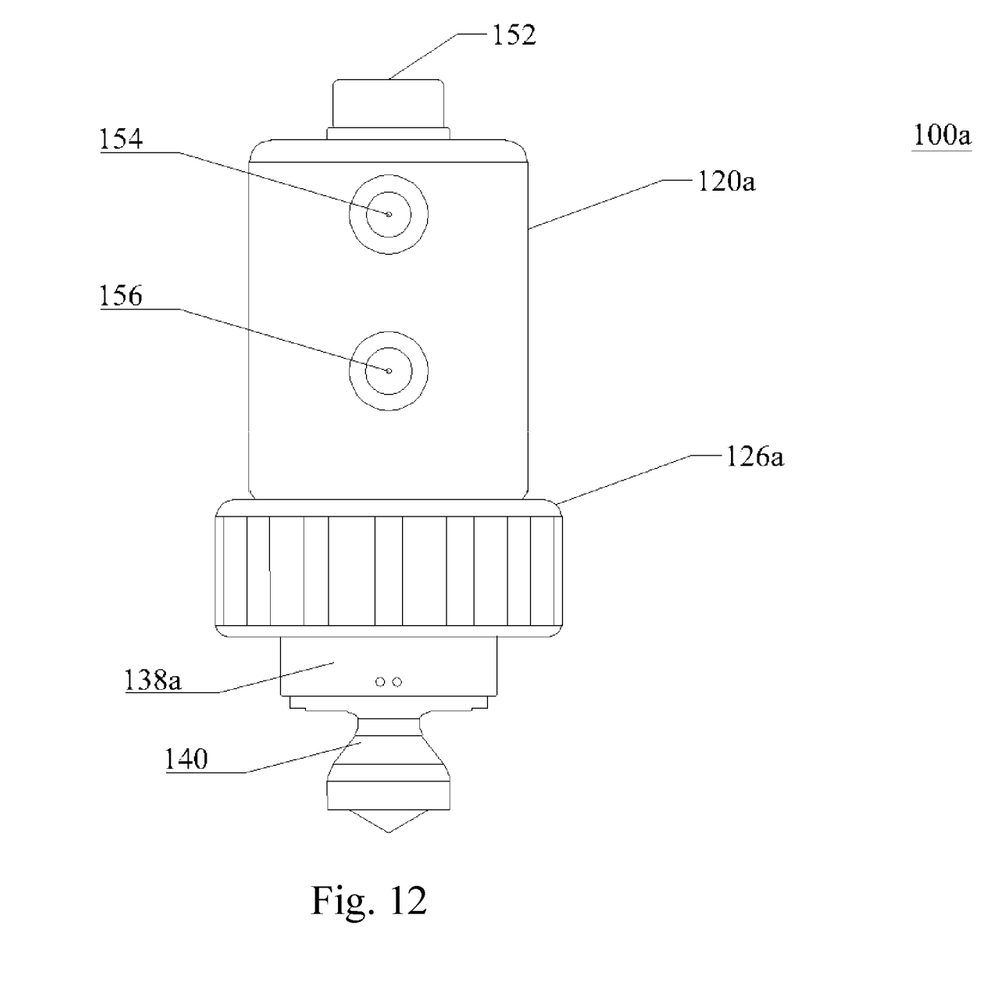
FIG. 12 is a perspective view of a controller of the diaphragm valve in FIG. 11.

FIG. 11 is a perspective view of a diaphragm valve 10a according to another embodiment of the present disclosure. FIG. 12 is a perspective view of a controller 100a of the diaphragm valve 10a in FIG. 11. As an alternative embodiment, the controller 100 of FIG. 2 can be replaced with a pneumatic controller 100a. of FIG. 12. As shown in FIG. 11, the diaphragm valve 10a comprises a controller 100a and a body 200. As shown in FIG. 12, the controller 100a comprises a cylinder 120a and a diaphragm 140. The diaphragm 140 is driven by the air pumped and exhausted through the pneumatic outlet 154 and the pneumatic inlet 156.

To sum up, the diaphragm valves described in the embodiments of the present disclosure can performed precise and accurate fluid control, and is extremely advantageous as a device used in, for example, a semiconductor production line or a production line of various chemicals.

Although the present disclosure and its advantages have been described in detail, it should be understood that various changes, substitutions and alterations can be made herein without departing from the spirit and scope of the disclosure as defined by the appended claims. For example, many of the processes discussed above can be implemented in different methodologies and replaced by other processes, or a combination thereof. Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A valve comprising:
a controller comprising a diaphragm; and
a body comprising:
an opening covered by the controller;
a chamber containing the diaphragm moving inside;
a channel comprising a first section, a second section, a third section and a fourth section wherein an end of the second section connects to an inlet of the chamber, an outlet of the chamber connects to an end of the third section, a flow in the second section diverts to the chamber from a central line of the first section, and the flow in the third section returns from the chamber to a central line of the fourth section;
an annular bulge protruding from an inner wall of the end of the second section wherein the annular bulge has a shape to be blocked by the diaphragm when the diaphragm is moved to contact the end of the second section; and
a conical protrusion on the diaphragm, a flat area around the conical protrusion, and an annular groove on the flat area wherein the annular groove fits the annular bulge.

2. The valve according to claim 1, further comprising a conical protrusion on the diaphragm to guide the flow.

3. The valve according to claim 1, further comprising an annular groove on the diaphragm to engage the annular bulge.

4. The valve according to claim 1, wherein the end of the second section is in a plane perpendicular to a central line of the chamber.

5. The valve according to claim 1, wherein an angle between a central line of the chamber and a perpendicular line of the first section of the channel is in a range of 20 to 60 degrees.

6. The valve according to claim 1, wherein an angle between a central line of the chamber and a perpendicular line of the first section of the channel is 35 degrees.

7. A valve comprising:
a controller comprising a diaphragm; and
a body comprising:
an opening covered by the controller;
a chamber containing the diaphragm moving inside;
a channel comprising a first section, a second section, a third section and a fourth section wherein an end of the second section connects to an inlet of the chamber, an outlet of the chamber connects to an end of the third section, a flow in the second section diverts to the chamber from a central line of the first section, and the flow in the third section returns from the chamber to a central line of the fourth section;
a conical protrusion on the diaphragm to guide the flow; and
a flat area around the conical protrusion, and an annular groove on the flat area wherein the annular groove fits the annular bulge.

8. The valve according to claim 7, wherein the end of the second section is in a plane perpendicular to a central line of the chamber.

9. The valve according to claim 7, wherein an angle between a central line of the chamber and a perpendicular line of the first section of the channel is 35 degrees.

10. The valve according to claim 7, further comprising an annular bulge protruding from an inner wall of the end of the second section wherein the annular bulge has a shape to be blocked by the diaphragm when the diaphragm is moved to contact the end of the second section.

11. The valve according to claim 10, further comprising an annular groove on the diaphragm to engage the annular bulge.

12. A valve comprising:
a controller comprising a diaphragm with a conical protrusion on the diaphragm, a flat area around the conical protrusion, and an annular groove on the flat area; and
a body comprising:
an opening covered by the controller;
a chamber containing the diaphragm moving inside;
a channel comprising a first section, a second section, a third section and a fourth section wherein an end of the second section connects to an inlet of the chamber, an outlet of the chamber connects to an end of the third section, a flow in the second section diverts to the chamber from a central line of the first section, and the flow in the third section returns from the chamber to a central line of the fourth section; and
an annular bulge protruding from an inner wall of the end of the second section wherein the annular bulge fits the annular groove and has a shape to be blocked by the diaphragm when the diaphragm is moved to contact the end of the second section,
wherein the end of the second section has a shape to be blocked by the diaphragm when the diaphragm is moved to contact the end of the second section, and
wherein an angle between a central line of the chamber and a perpendicular line of the first section of the channel is in a range of 20 to 60 degrees.

13. The valve according to claim 12, wherein an angle between the central line of the chamber and a perpendicular line of the first section of the channel is 35 degrees.

14. The valve according to claim 12, further comprising a conical protrusion on the diaphragm to guide the flow.

15. The valve according to claim 12, wherein the end of the second section is in a plane vertical perpendicular to the central line of the chamber.

16. The valve according to claim 12, further comprising an annular groove on the diaphragm to engage the annular bulge.

* * * * *